United States Patent [19]

Neupauer

[11] Patent Number: 4,873,619

[45] Date of Patent: Oct. 10, 1989

[54] METHOD AND APPARATUS FOR CONTROLLING A STATIC CONVERTER AT AN ASYMETRICAL NETWORK

[75] Inventor: Elfriede Neupauer, Erlangen, Fed. Rep. of Germany

[73] Assignee: Siemens A.G., Munich, Fed. Rep. of Germany

[21] Appl. No.: 269,247

[22] Filed: Nov. 9, 1988

[30] Foreign Application Priority Data

Nov. 12, 1987 [DE]  Fed. Rep. of Germany ....... 3738470

[51] Int. Cl.$^4$ ...................... H02M 7/04; H02M 7/68
[52] U.S. Cl. ...................................... 363/51; 363/37; 363/87; 363/96
[58] Field of Search ...................... 363/35, 37, 51, 65, 363/69, 70, 84–87, 96, 128–129

[56] References Cited

U.S. PATENT DOCUMENTS

| | | | |
|---|---|---|---|
| 4,177,507 | 12/1979 | Leete | 363/51 |
| 4,222,097 | 9/1980 | Rogowsky | 363/51 |
| 4,638,416 | 1/1987 | Neupauer et al. | 363/51 |
| 4,685,044 | 8/1987 | Weibelzahl et al. | 363/51 |
| 4,727,467 | 2/1988 | Bendl et al. | 363/51 |

*Primary Examiner*—Peter S. Wong
*Attorney, Agent, or Firm*—Kenyon & Kenyon

[57] ABSTRACT

In order to maintain in a rectifier or an inverter, operation with a constant terminal d-c voltage in the event of an asymmetry of the network on the a-c side, the present invention provides a voltage analyzer which determines an asymmetry signal with which a given control angle is modulated. For an inverter, the modulation is accomplished by the formula $\cos = (-U_=\cdot \cos_0 - 2d_x \cdot i_d)/|\overline{U}(t)|$, where $U_= = |U'| - |U''|$ is the difference of the co-rotating system amplitude and the counter system amplitude and gives the maximally attainable d-c voltage values and $\overline{U}(t)$ (the instantaneous amplitude of the fundamental system). The d-c voltage is thereby limited to the value $U_=$ and contains no variations caused by the network asymmetry.

12 Claims, 6 Drawing Sheets

METHOD AND APPARATUS FOR CONTROLLING A STATIC CONVERTER AT AN ASYMETRICAL NETWORK

The present invention relates to a method and apparatus for controlling with a preset control angle a converter connected to a three-phase network and a d-c circuit.

BACKGROUND OF THE INVENTION

A d-c terminal voltage of a converter bridge circuit, which is connected to the a-c voltage side to the individual phase conductors of a three-phase network, is determined by the phase of the respective phase conductor voltage at which a bridge arm connected to this phase conductor is fired and conducts current. By presetting a control angle or a control voltage for firing the converter valves with reference to the three-phase network, it is thereby possible to preset a desired d-c terminal voltage to the connected d-c circuit or to control the current flowing through the converter by a superimposed current control. In a symmetrical voltage system of the three-phase network, equal time intervals for the firing instants of the bridge arms are then obtained in the steady-state condition. The bridge arms are therefore fired with equidistant firing angles, with reference to a voltage synchronous with the network.

However, the symmetry of the network is disturbed if there is a short circuit in the three-phase network. If the converter valves receive a common control angle for all bridge arms, a smaller d-c terminal voltage occurs in the d-c circuit on which an undesired pulsating component is superimposed. For an inverter, a problem occurs in that the current flowing through the one valve of a bridge arm pair increases like a short circuit and is not commutated from this valve fast enough to another bridge arm pair before the other valve of the first bridge arm pair is fired. A so-called inverter flipping then occurs where both valves of a bridge arm pair carry current and short the d-c terminal voltage.

The converter must therefore be blocked until the network fault is eliminated in the event of network shorts or other asymmetries of the three-phase network. In this way, the power transmission via the converter is interrupted for an extended period of time. However, it is frequently desirable to operate a machine connected to the converter at least with reduced power until the undisturbed network voltage recurs. One particular field of application is the high-voltage d-c transmission (HVDC) between two three-phase networks which are connected to each other by a first converter operated as a rectifier, a transmission line and a second converter operated as an inverter. For HVDC transmission, it is desirable that in the event of network disturbances which are present for several periods of the three-phase networks, the power transmission is not completely interrupted so that the undisturbed network is influenced as little as possible by the disturbance in the other network. A minimal disturbance of the basically undisturbed network can also be sought if this network is connected via the converter to another short circuit-prone load such as a machine.

A problem, therefore, exists in the regulation or control of energy transmission through a converter when the voltage system of a three-phase network coupled to the converter is asymmetrical.

SUMMARY OF THE INVENTION

This and other problems are solved by forming an asymmetry signal picking up an instantaneous asymmetry in the voltage system of the three-phase network and by modulating the pre-set control angle with this signal. In certain embodiments, the asymmetry signal is formed from instantaneous values of the voltage systems and corresponds to the ratio of the maximally obtained d-c voltage component by rectification of the asymmetrical voltage system of the d-c terminal voltage and the instantaneous amplitude of the voltage system.

The present invention also provides an apparatus for controlling a converter coupled to a three-phase network and a d-c circuit. This apparatus comprises a voltage analyzer coupled to the three-phase network which senses and forms instantaneous values of a co-rotating voltage system and a counter voltage system of the three-phase network. A control unit is coupled to the voltage analyzer and sets a predetermined control angle. The predetermined control angle is modulated with a modulation signal by means for modulating.

DETAILED DESCRIPTION

Figure 1:
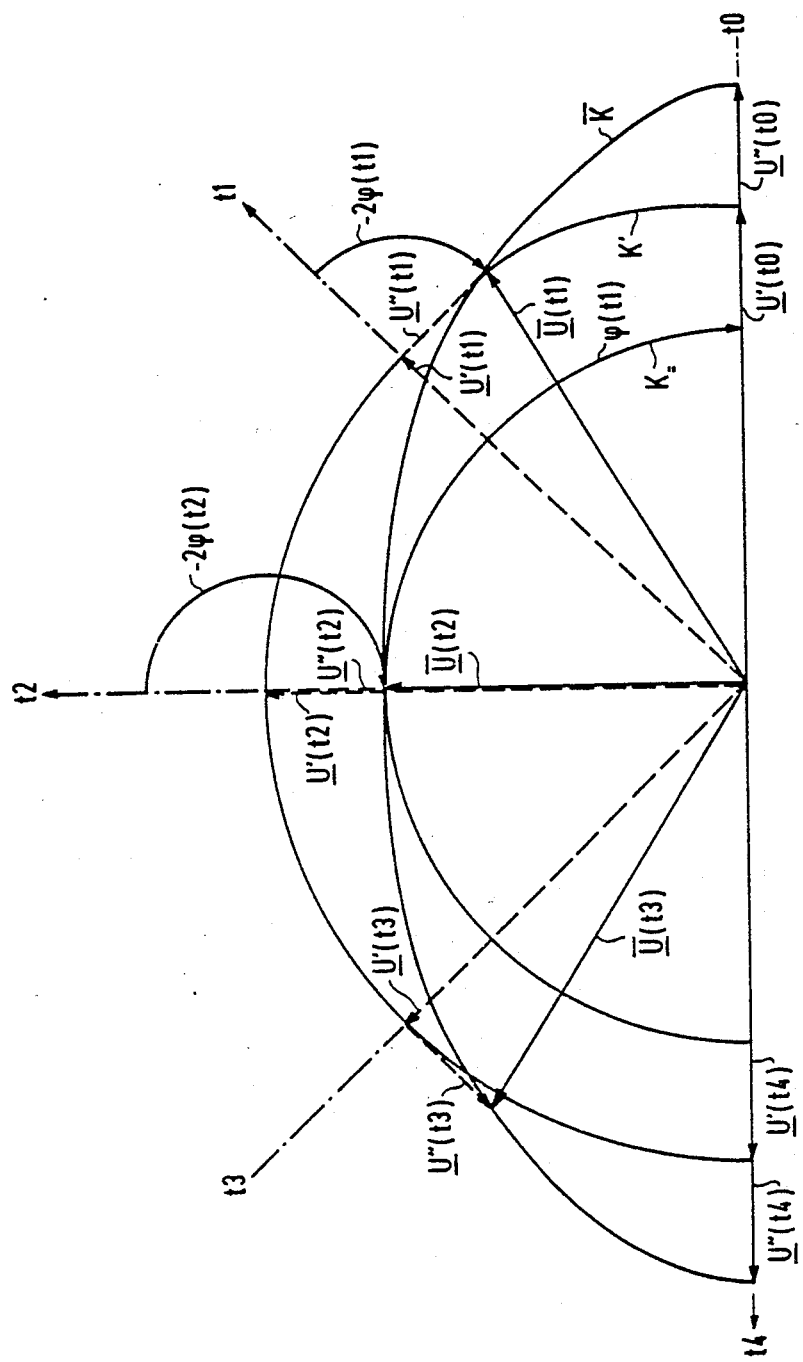
FIG. 1 is a vectorial representation of an asymmetrical voltage system.

As is well known, the phase conductor voltages $U_R$, $U_S$, $U_T$ at the terminals R, S, T of a converter on the three-phase side can be conceived as projections of a voltage vector U (t) rotating at the network frequency on three axes mutually offset by 120°, on which optionally a null-system component $u0=(U_R+U_S+U_T)/3$ is superimposed. This is shown in FIG. 1. In a symmetrical network free of harmonics the magnitude $|U(t)|$ of this voltage vector U (t) and its velocity of rotation are constant. In this context, an asymmetry can be thought of as the sum of a symmetrical system rotating with a positive network frequency (co-rotating system) and a symmetrical system rotating with a negative network frequency (counter system). FIG. 1 shows the curve in space $\overline{K}$ on which proceeds the vector $\overline{U}$ (t) which corresponds to the fundamental of the asymmetrical network.

It is assumed here that the following applies for the phase $\phi(t)$ for the time $t_0$: $\phi(t_0)=\omega\cdot t_0=0$ and the vector U' ($t_0$) corresponding to the co-rotating system and the vector U'' ($t_0$) corresponding to the counter system have the same direction.

At the point in time t1, the co-rotating system vector U' (t) is rotated on the circle K' by the angle $\phi(t1)=\omega\cdot t1$ up to the position U' (t1). The counter system vector, on the other hand, occupies the position U'' (t1) which is tilted relative to U' (t1) to the difference angle $-2\omega(t1)$ at the difference velocity $2\omega$. The corresponding network system vectors and the counter system vectors with their difference angles are shown for the points in time t2, t3 and t4, so that the vectors (U(t2), U(t3), U(t4)) shown are obtained for the points in time t0 . . . t4.

The asymmetrical fundamental system $\overline{U}(t)$ can be presented not only as the sum of the co-rotating system and the counter system, but also as the sum of a component rotating on the circle $K_=$ having the constant instantaneous amplitude $|U'(t)| - |U''(t)|$ and a further pulsating asymmetry component which is ignored in the following equations. The relative asymmetry of the network can therefore be determined for any time t by a scalar asymmetry signal $$\frac{|U'(t)| - |U''(t)|}{|U'(t)| + |U''(t)|}$$

where $|U'(t) \cdot U''(t)| = |\overline{U}(t)|$ represents the instantaneous amplitude of the fundamental system, i.e., the three-phase system itself.

This analysis applies also to changes of the fundamental frequency. However, it is a condition for the application of this analysis that the instantaneous values U'(t) and U''(t) of the co-rotating system and the counter system can be determined with sufficient speed and accuracy. It is described in U.S. Pat. No. 4,665,474 how, by determining the co-rotating voltage system and the counter voltage system, a reference voltage synchronized with the fundamental of the recurring voltage can be determined for an initially asymmetrical and harmonic-carrying three-phase system even after a disturbance in the network.

This method can be used according to U.S. Pat. No. 4,638,416 to make the transition to control normal operation after a disturbance in one of the two networks connected by HVDC. In this process, one control angle is always given for all bridge arms of a converter and this control angle is run up, after the network disturbance is terminated, from a starting value near 90° to the end value belonging to the rectifier operation of the one station and to the inverter operation of the other station.

It is assumed here that the asymmetry of the recurring network decays before the control angle has reached its final value so that the pulsations of the current and/or the voltage caused by the decaying network asymmetry in the d-c circuit have already decayed before the controls of both converters have been leveled to their final value. Pulsations which would transmit the asymmetry of the disturbed network to the operation of the converter connected to the undisturbed network and therefore disturb the stability and the control behavior of the entire installation, can safely be tolerated only temporarily and in an uncritical operating range. In continuous operation, however, a network short circuit in one of the networks is detected as a network disturbance and triggers a complete interruption of the power transmission between the networks.

A similar disturbance of the energy transmission is generally present if two converters are coupled to each other in the manner of an intermediate-link converter via a d-c link (or also an intermediate d-c circuit).

Assume a converter in a symmetrical three-phase network is operated with a control angle $\alpha=0°$, i.e., with full rectifier operation, under operating conditions in which no current flows through the converter. The d-c terminal voltage $U_d$ of the converter then has a value $U_{di}$ which is designated as the ideal no load direct voltage and is proportional to the instantaneous fundamental amplitude $|\overline{U}(t)|$. The value $U_d=$const. $|\overline{U}(t)| \cdot \cos \alpha$ is obtained for a firing angle $\alpha \neq 0°$ if it is ignored that in the commutation of the current from one bridge arm to another, both bridge arms temporarily carry current and therefore a voltage break designated as an inductive d-c voltage drop is generated.

Since the inductive voltage drop is proportional to the current $i_d$ flowing through the converter and the d-c circuit (proportionality constant $d_x$), the following relationship between the fundamental amplitude $|\overline{U}(t)|$ of the three-phase system and the d-c terminal voltage $U_d$ is obtained: $U_d=$const. $|\overline{U}(t)| \cdot \cos \alpha - d_x \cdot i_d$.

Figure 2:
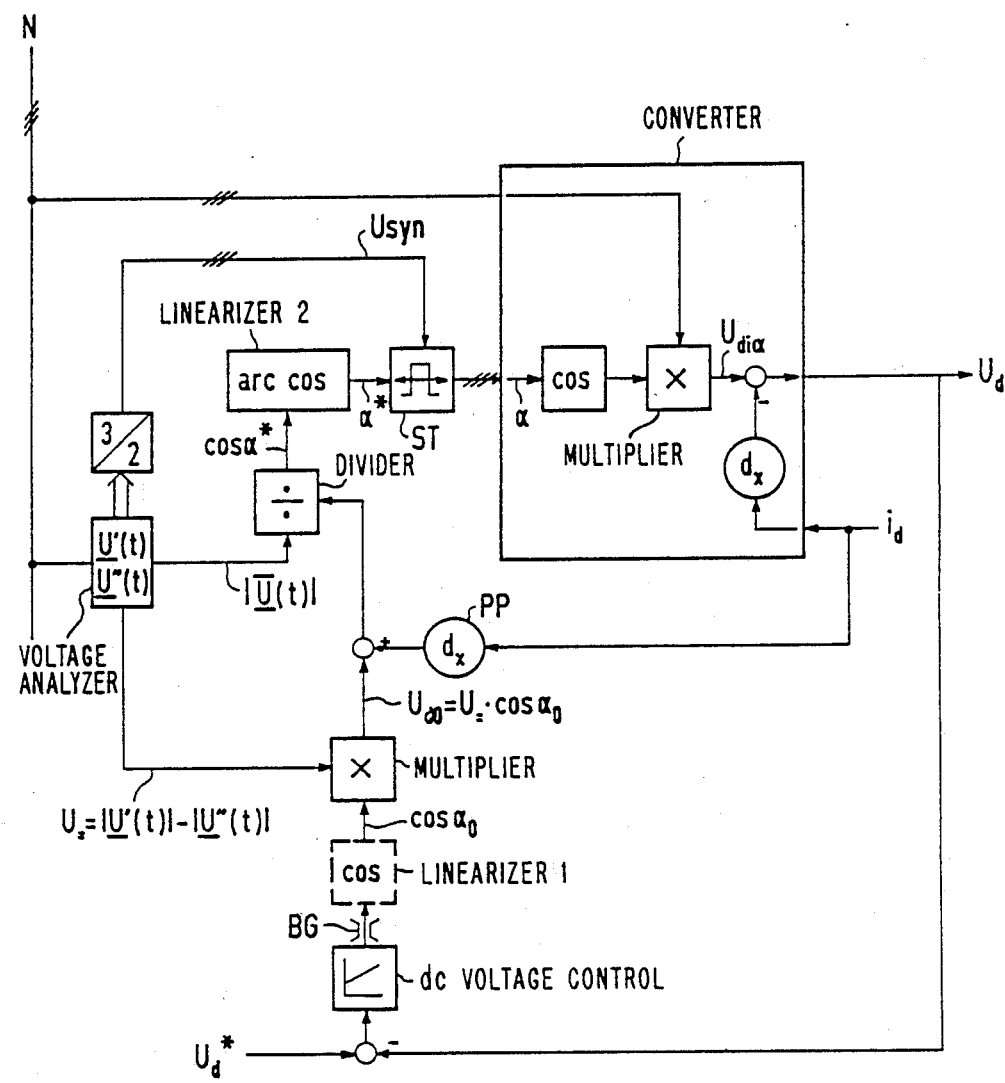
FIG. 2 is a block diagram of apparatus according to the present invention for operating a rectifier.

In FIG. 2, a converter which is connected on the a-c side to the network N and on the d-c side to the d-c voltage $U_d$, is represented by an equivalent circuit SR. For the asymmetrical case in which the vector $\overline{U}(t)$ proceeds on the curve $\overline{K}$ of FIG. 1, it is seen from this equivalent circuit SR that the instantaneous fundamental amplitude does not fall below the value $|U'(t)| - |U''(t)|$, as long as no appreciable currents flow. This value is given by the radius of the circle $K_=$ and is equal to the minimum value of the ideal no-load d-c voltage of the converter at an asymmetrical network, while the maximum value of the ideal no-load d-c voltage is given by $|U'(t)| + |U''(t)|$. The radius of the circle $K_=$ thus gives a d-c voltage component in the d-c terminal voltage that does not fall below the output d-c voltage $U_d$ for a maximum rectifier control angle ($\alpha=0°$) and negligible inductive d-c voltage drop. Thus, this is the d-c voltage component maximally achievable by rectification of the asymmetrical three-phase voltage network in the d-c terminal voltage. On this maximum d-c voltage component, however, a voltage component pulsating at twice the network frequency is further superimposed, which is frequently undesirable for the use of the converter as a d-c current control element or d-c voltage control element within a control action.

FIG. 2 shows an apparatus according to the invention, by which such pulsations can be suppressed in the control or regulation, for example, of the intermediate link voltage $U_d$ to a reference value $U_{d*}$. The intermediate link voltage $U_d$ is limited here to the maximum d-c voltage component $U_= = |U'(t)| - |U''(t)|$ in order to generate, accordng to the relationship $\cos \alpha_0 = U_d/U_=$, a reduced ideal no-load d-c voltage $U_{d0}$ belonging to $U_=$. As seen from FIG. 2, this can be accomplished by limiting the output signal of a corresponding d-c voltage control CU in a limiter BG. The limited output signal is then converted in a subsequent linearizer LIN1, a cosine transmitter in the illustrated embodiment, into a control signal of $\cos \alpha_0$. A network voltage analyzer DET determines the instantaneous amplitudes of the co-rotating system U'(t), of the counter system U''(t) and the fundamental $\overline{U}(t)$. A multiplier MP forms from these instantaneous amplitudes the quantity $U_{d0}=U_= \cdot \cos \alpha_0$.

For compensating for the inductive voltage drop, a voltage is added to $U_{d0}$ from a proportional amplifier PP with the gain $d_x$, this added voltage corresponding to the ideal no-load d-c voltage $U_{di}$ in the equivalent circuit SR of the converter. This quantity is divided in a divider DIV by the instantaneous amplitude of the fundamental $\overline{U}(t)$. Thereby is now generated a control signal $\cos \alpha^*$ which corresponds, according to the relationship $\cos \alpha^* = (U_= \cdot \cos \alpha_0 + d_x \cdot i_d)/\overline{U}(t)$, to the signal $\cos \alpha_0$ modulated with the asymmetry signal $U_=/$-

$|\overline{U}(t)|$ and corrected by the inductive d-c voltage drop. This signal (cos $\alpha^*$) can be converted in a second linearizer LIN2 into the firing angle $\alpha^*$ which is then fed into a control unit ST. This control unit ST is synchronized with a network by a synchronizing voltage Usyn. In the illustrated embodiment, the phase angle of the network system is formed as the synchronizing voltage Usyn by the network voltage analyzer DET.

For vanishing asymmetry, i.e., $|U''(t)|=0$ and $\overline{U}(t)=U'(t)$, the given control angle $\alpha_0$ is therefore not modulated but instead is only corrected by the inductive d-c voltage drop. The control unit ST therefore forms the equidistant firing pulses $\alpha_i$ required for the symmetrical case for the individual bridge arms of the converter. An asymmetry in the fundamental amplitude $\overline{U}(t)$ of the three-phase system, however, leads to the modulation of $\alpha^*$, i.e., to a time-dependent signal $\alpha^*(t)$. Phases are therefore obtained for the firing pulses of the individual bridge arms of the converter SR, these phases being corrected by corresponding correction angles $\Delta\alpha_i$ relative to the equidistant firing pulses and their $\alpha_{i0}$.

Figure 3:
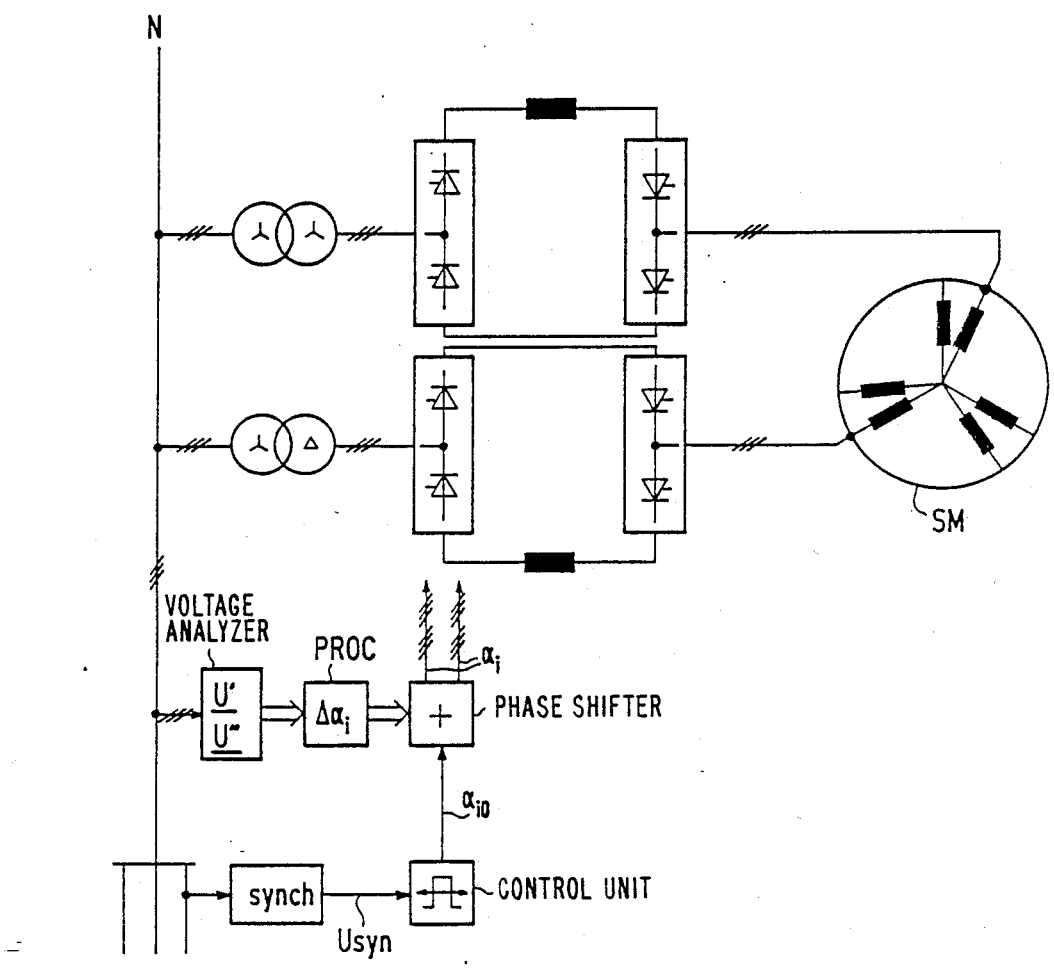
FIG. 3 shows an embodiment of the present invention applied to the operation of a converter-fed synchronous machine or converter motor.

An application of the above-described principle is shown in FIG. 3 by the example of a synchronous machine SM fed on the network side via two separate converters. The synchronous machine SM has two stator windings offset electrically by 30° el. The control of the converters on the machine side as well as the superimposed control of the machine is not shown here. A filter stage synchronizer connected to one phase of the three-phase network N forms the synchronizing voltage Usyn which is provided to a digital control unit SZ (for instance, SIMADYN D). This control unit SZ produces the equidistant firing pulse $\alpha i0$ for the two individual converters on the network side of the entire converter arrangement. This commercially available arrangement of synchronizer and control unit, provided for the symmetrical situation can now be used, according to the invention, if a network short circuit or other causes for asymmetrical voltages occur in the network N. To this end, the co-rotating system and a counter system (and therefore also the component $U_=$) are determined by the network voltage analyzer DET from which a subsequent optimizing computer PROC forms the correction angles $\Delta\alpha i$ modulated in accordance with the asymmetry of the network. These correction angles $\Delta\alpha_i$ are fed to a phase shifter PS which forms the corrected firing angles $\alpha_i$ from the correction angles $\Delta\alpha_i$.

In intermediate link converters, in which converters on the load side are controlled in accordance with a pulse method, the constancy of the voltage or the current in the intermediate link is particularly important. In the exemplary embodiment of FIG. 4, the intermediate circuit voltage $U_d$ is controlled by a voltage control CU, the output variable of which is used as the reference value $i_{d*}$ for a subordinated control of the intermediate link current $i_d$. The d-c voltage control CU should be understood here, however, only as an example of a superimposed control in the outer loop of a control. The subject of the invention is in particular the inner loop of the control which acts on the rectifier RR and comprise the two control building blocks CR1 and CR2. The current reference value $i_{d*}$ is fed in the building block CR1 to a current controller CI together with the actual $i_d$, and is also fed to a proportional member PP which produces a signal $d_x \cdot i_{d*}$ that is added to the output signal of the current controller CI for compensating the inductive voltage drop. A signal $\alpha_{0v}$ is also connected to the controller output signal for a pilot control of the current controller CI in order to take into consideration the counter voltage generated by the inverter, not shown, of the converter arrangement. In the symmetrical case, it is assumed that a minimum-value selection circuit (min) selects the signal so formed and feeds it to the divider DIV in the subassembly CR2. The divider modulates a cosine signal of the difference of the instantaneous amplitudes of the co-rotating system and the counter voltage system with the instantaneous amplitude of the fundamental. As was already explained in FIG. 2, this divider is connected to the network voltage analyzer DET and its output signal is fed into the linearizer LIN2 via a starting transmitter HG. The control unit ST forms from the output of the linearizer LIN2 and from the synchronizing voltage Usyn the firing pulses $\alpha i$ for the valves of the rectifier RR, as already explained in FIG. 2.

In the event of a network short, the rectifier is no longer able to provide the current $i_{d*}$ required for maintaining the voltage reference value $U_{d*}$ and the controllers CU and CI go toward the limit. During this disturbance, however, an energy transport with reduced d-c voltage should still be possible. Corresponding to full drive $\alpha_0 = 0°$, the maximum d-c voltage component is now entered into the component CR1 by the detector DET through a multiplier and is selected by the selection circuit min which then takes over the role of the limiter BG of FIG. 2.

Figure 4:
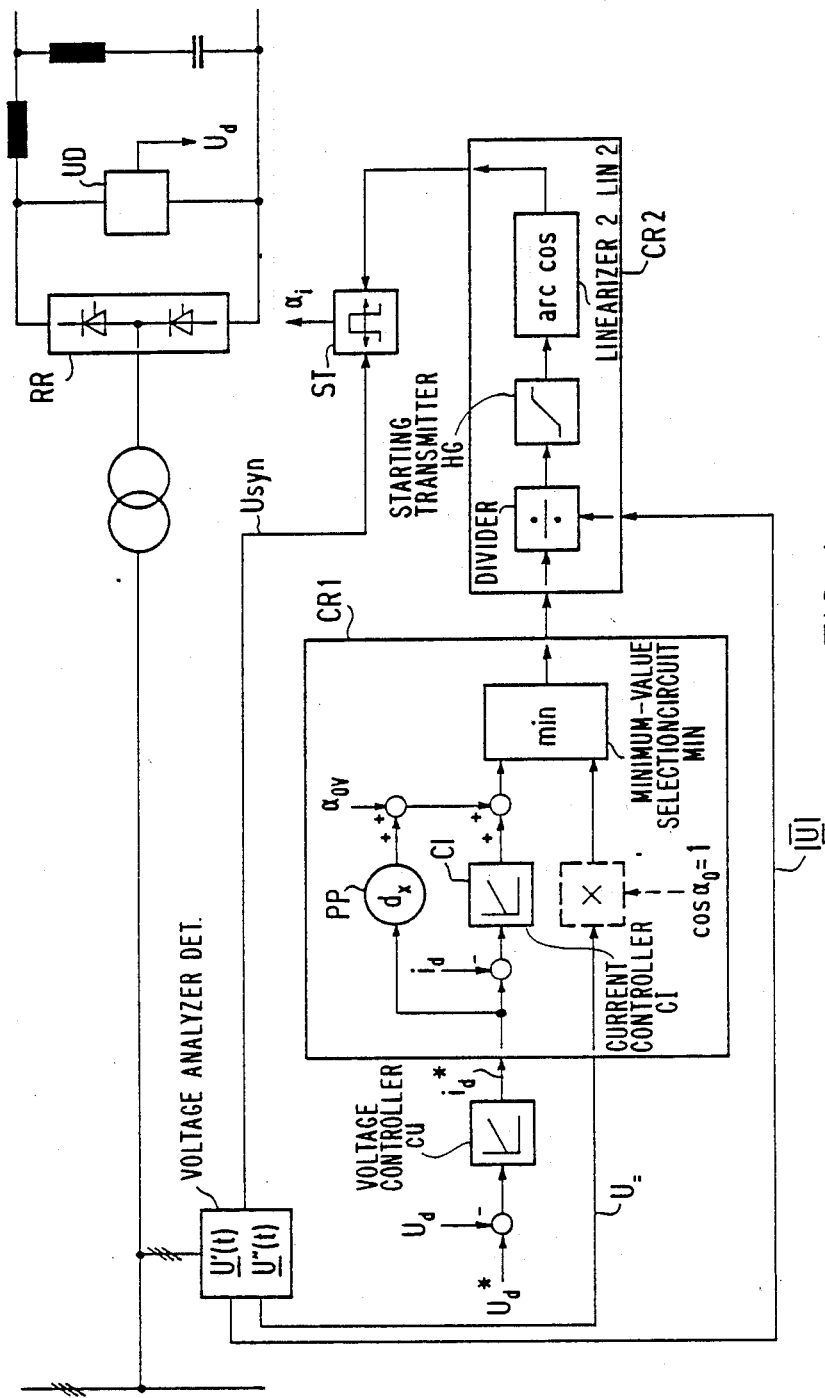
FIG. 4 shows another embodiment of apparatus according to the present invention for the operation of a rectifier.

This rectifier operation according to FIG. 4 can also be provided at the rectifier station of an HVDC. The present invention is also useful for inverter operation, where a short circuit current flowing is a network short circuit causes an increase of the duration of the commutation and thereby increases the risk of inverter flipping.

For inverter operation, using the no load d-c voltages $U_{di\gamma}$ and $U_{di\beta}$, which relate to the inverter firing angle $\beta$ and the quenching angle $\gamma$ with $U_{di\beta} = -|\overline{U}|(t) \cos \beta$, $U_{di\gamma} = -|\overline{U}(t)|\cos \gamma$, and taking into consideration the direction of current flow of the d-c current $i_d$, the following relationships between the inverter terminal d-c voltage $U_{d\beta}$, the inverter firing angle $\beta$ given by the control unit, the quenching angle $\gamma$ and the d-c current $i_d$ is obtained: $U_{d\beta} = |-\overline{U}(t)| \cdot \cos \beta - d_x \cdot i_d = |-\overline{U}(t)| \cdot \cos \gamma + d_x \cdot i_d$; $d_x \cdot i_d = (\cos \gamma - \cos \beta) \cdot |\overline{U}(t)|/2$; $\cos \beta = \cos \gamma - 2 \cdot d_x \cdot i_d / |\overline{U}(t)|$.

Figure 5:
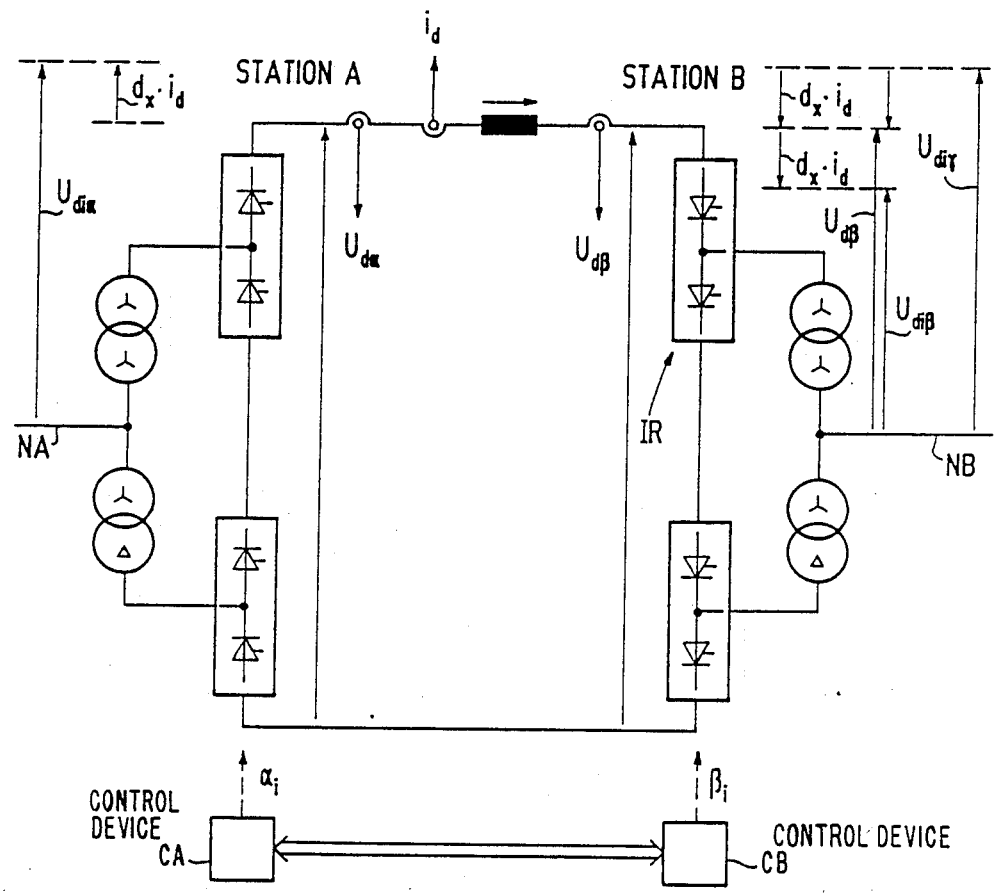
FIG. 5 shows an application of the present invention in a d-c high voltage transmission.

In FIG. 5, the corresponding voltages are shown for an HVDC short coupling, where two networks NA and NB are coupled to each other via the converters of the corresponding, physically adjacent stations A and B and an intermediate d-c circuit. The control devices CA and CB furnish the rectifier firing angle $\alpha i$ and inverter firing angles $\beta i$ for driving the converter valve. These control devices CA, CB exchange operating data with each other.

Figure 6:
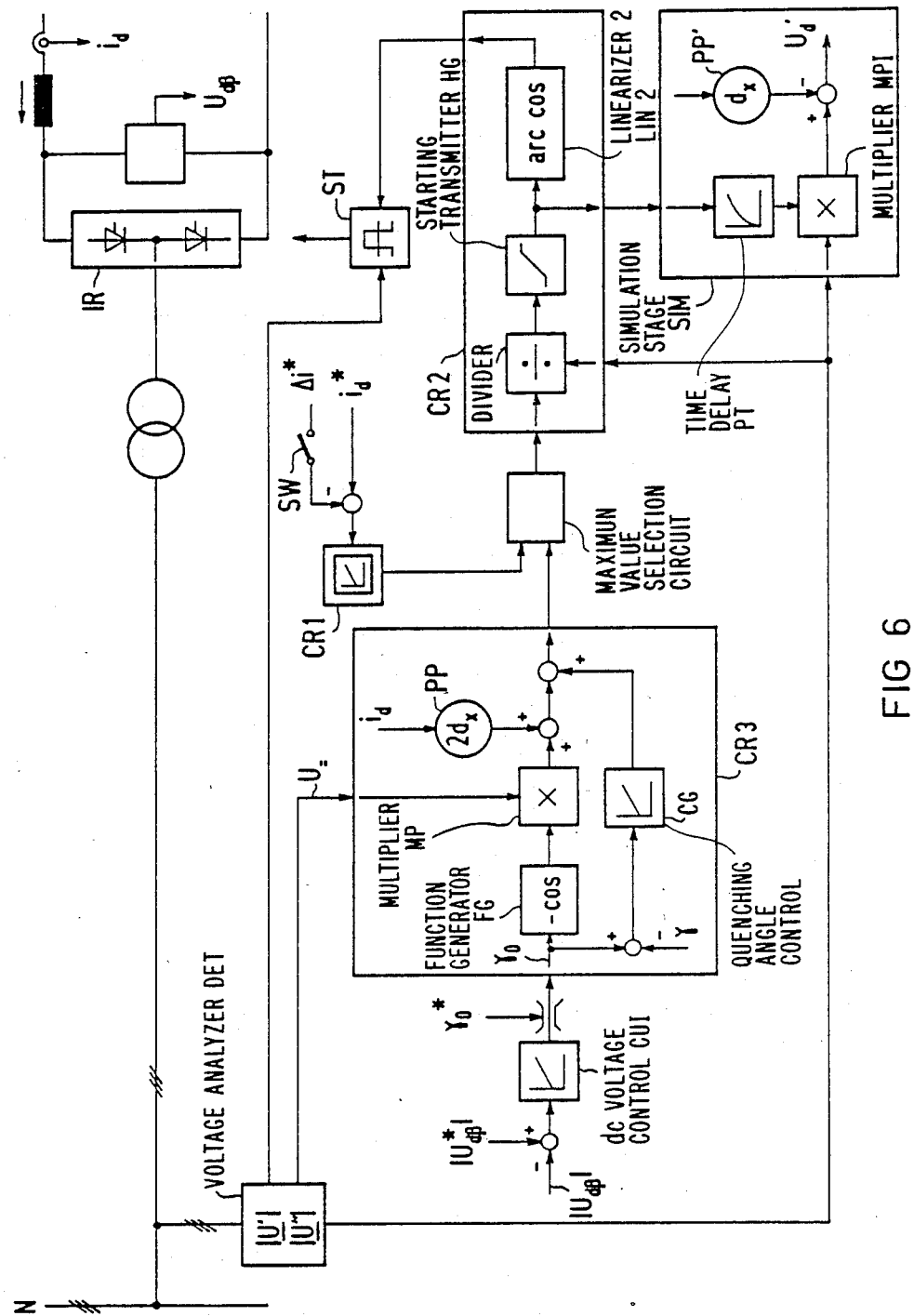
FIG. 6 shows the apparatus of the present invention coupled so as to control an inverter.

According to the desired mode of operation, an inverter IR of station B can be operated with respect to minimal reactive power with a minimum preset value $\gamma_{0*}$ of the quenching angle or with a variable quenching angle $\gamma 0$ which is preset by a superimposed control, for example, with respect to voltage constancy of the network N or the d-c circuit. In the example of FIG. 6, it is assumed that the d-c current is impressed by the control of the rectifier, not shown, while the inverter IR impresses on the intermediate circuit the d-c voltage $U_{d*}$. Therefore, the outer loop of the HVDC control according to FIG. 6 contains a d-c voltage control CUI on the inverter side, the output signal of which forms the reference value for subordinated quenching angle control, where the quenching angle must be limited to a value $\gamma_0*$ corresponding to the inverter flipping limit. In the illustrated embodiment, a corresponding limiter for the control output signal is provided and the limited output signal $\gamma 0$ is fed, together with the actual quenching angle $\gamma$, to the quenching angle control CG. In order to arrive at a fast and exact control of the quenching angle and to be able at the same time to react quickly to a network asymmetry, the output signal of the quenching angle control CG is added in the sense of a pilot control with a signal calculated from $\gamma 0$ which is derived in accordance with the following relationships:

$U_= \cdot \cos \gamma_0 = |\overline{U}(t)| \cdot \cos \gamma = |\overline{U}(t)| \cos \beta + 2 \cdot d_x \cdot i_d$; $\cos \beta = (U_= \cdot \cos \gamma_0 - 2 \cdot d_x \cdot i_d)/|\overline{U}(t)|$; $\cos (180° - \beta) = (-U_= \cdot \cos \gamma_0 + 2 d_x \cdot i_d)/\overline{U}(t)$.

In the symmetrical case, $|\overline{U}(t)| = |U'(t)| + |U''(t)| = U_=$ applies, where $U_=$ can be taken off at the network voltage analyzer DET. The angle $(180° - \beta)$ calculated thereby corresponds to a rectifier firing angle $\alpha$ near 180° and fulfills the physical relationship between the quenching angle and the firing angle so that the quenching angle control CG needs to execute only small corrections.

In the asymmetrical case, the calculated firing angle brings about the limitation to the value $U_= \cdot \cos \gamma_0$ of the ideal no load d-c voltage $|\overline{U}(t)| \cdot \cos \gamma$ caused by the actual quenching angle $\gamma$. If, therefore, the rectifier of the HVDC, not shown, keeps the intermediate-link current sufficiently constant, it is ensured thereby that the intermediate link voltage remains constant in spite of the modulation of $|\overline{U}(t)|$ in time. In accordance with the last-mentioned formula, the angle $\gamma_0$ preset for controlling the inverter is therefore changed by a function generated FG and the multiplier MP into $U_{di\gamma}$. This is corrected by the correction signal $2 \times d_x \cdot i_d$ furnished by the proportional amplifier PP. In this manner an unmodulated signal $U_= \cdot \cos (180° - \beta')$ is obtained which is fed to a maximum value selection circuit (max) after correction by the quenching angle control CG.

This selection member is provided for HVDC installations in which both converters can operate as rectifiers as well as inverters, so that the control devices CA and CB of both converter stations are essentially of the same design. The maximum value selection circuit max is coupled at its other input to the subassembly CR1 which was already explained with reference to FIG. 4. Therefore, both stations contain the same inner loop of control which comprises the subassemblies CR1, CR2 and CR3, besides the selection circuit. The outer loop of the control can contain here, corresponding to the control CU of FIG. 4, a superimposed control which obtains the current reference value $i_{d*}$, for instance, from an active-load control in order to impress the corresponding current $i_{d*}$ on the HVDC line.

In the rectifier station, the subassembly CR1 takes over the formation of the firing angle, while the quenching angle control CG is at a negative limit because of the rectifier operation, and the subassembly CR3 is taken out of engagement by the maximum value selection circuit (max). In the station operated as an inverter, a negative supplemental reference value $\Delta i*$ is added by closing a switch SW to the reference value $id*$ (the so-called marginal current), so that the reference value $i_d*$ of this station is smaller than the actual value impressed by the rectifier station. Consequently, the current controller C1 is at the negative limit in the subassembly CR1 there, and the maximum value selection circuit (max) brings the quenching angle control CG and thereby the subassembly CR3 of this station into engagement.

The maximum value selection circuit (max) is followed by the subassembly CR2 with a divider DIV and a linearizer LIN2. A limiter is further provided which holds the firing angle, for instance, between a maximum rectifier drive of about $\alpha = 6°$ and an inverter drive corresponding to an inverter flipping limit of $\gamma_0* = 16°$, corresponding to a firing angle $\alpha = (180 - \beta) = 164°$. This limiter in FIG. 6 is a starting generator HG which prevents a sudden change of the firing angle by limiting its rate of change.

The control devices CA and CB in the two stations A and B are connectable via signal lines in the event of a short circuit so that in both stations the current reference value $i_{d*}$ is preset into the subassemblies CR1. A simulation value of the terminal d-c voltage of the converter is formed in a simulation stage SIM, shown in FIG. 6, having a time delay stage PT, the time constant of which is matched to the time delay of the converter. The simulation stage SIM has a multiplier MP' and a proportionality member PP' constructed according to the embodiment of the converter shown in FIG. 2. The simulation value $U_d$ can be sent, for example, to the other station and used there as the corresponding signal $\alpha_{0\nu}$ in the subassembly CR1.

The invention, therefore, makes it possible to provide in a converter arrangement, in which two converters are connected to the d-c side via an intermediate d-c link, an energy transmission even if an asymmetrical three-phase system is present at the three-phase terminals of one of the inverters.

What is claimed:

1. A method for controlling with a predetermined control angle a converter that is coupled to a three-phase network and to a d-c circuit, comprising the steps of:
    measuring an instantaneous asymmetry of the three-phase network; forming an asymmetry signal from the measured asymmetry; and modulating the control angle with said asymmetry signal.

2. The method according to claim 1, wherein the instantaneous asymmetry is measured and the asymmetry signal is formed from instantaneous values of the three-phase network, and said asymmetry signal corresponds to the ratio of a d-c voltage component maximally attainable by rectification of the asymmetrical three-phase-network and an instantaneous amplitude of the asymmetrical three-phase network.

3. The method according to claim 2, wherein said instantaneous values of the three-phase network are instantaneous amplitudes of a three-phase co-rotating system and a three-phase counter voltage system, and said asymmetry signal is determined from the ratio of the difference of both instantaneous amplitudes to the sum of both instantaneous amplitudes.

4. The method according to claim 1, further comprising the step of:
    forming a correction signal which corresponds to an inductive d-c voltage drop to correct the modulation of said control angle.

5. The method according to claim 4, wherein said correction signal is formed by a product of the current flowing through an inverter and a constant based on a machine parameter, normalized to an instantaneous amplitude of the asymmetrical three-phase network.

6. An apparatus for controlling a converter coupled to a three-phase network and a d-c circuit, comprising:
  (a) means for forming a predetermined control angle;
  (b) means for modulating said predetermined control angle with a modulation signal to control said converter;
  (c) a control unit coupled to said means for modulating; and
  (d) a voltage analyzer coupled to said three-phase network which senses and forms instantaneous values of a co-rotating voltage system and a counter voltage system of said three-phase network, said instantaneous values coupled as inputs to said means for forming a predetermined control angle and to said means for modulating.

7. The apparatus according to claim 6, wherein said instantaneous values include a difference of instantaneous amplitudes of the co-rotating system and the counter voltage system and an instantaneous amplitude of a fundamental, and said means for modulating includes a divider which modulates a cosine signal of said difference with the reciprocal value of the instantaneous amplitude of the fundamental.

8. The apparatus according to claim 7, wherein said means for modulating further includes an arccosine function generator coupled to the output of said divider.

9. The apparatus according to claim 6, wherein said voltage analyzer includes means for producing a synchronizing voltage that is synchronized with a fundamental of the three-phase system, said synchronizing voltage coupled as an input to said control unit.

10. The apparatus according to claim 7, wherein said apparatus is for controlling a rectifier or inverter, and further comprises means for forming a predetermined rectifier control angle signal, means for forming a predetermined inverter control angle signal, and a selection circuit coupled to receiver as inputs said rectifier control angle signal and said inverter control angle signal, and having an output coupled to an input of said divider.

11. The apparatus according to claim 6, further comprising means for adding to the modulated control angle a signal proportional to the current of the d-c circuit.

12. The apparatus according to claim 6, further comprising a controller for correcting said modulated control angle.

* * * * *